July 23, 1968 P. KANTOR ET AL 3,393,835
FLEXIBLE CONTAINER FOR A PUMPABLE SUBSTANCE AND METHOD
FOR DISCHARGING SUCH SUBSTANCE THEREFROM
Filed July 19, 1966 3 Sheets-Sheet 1
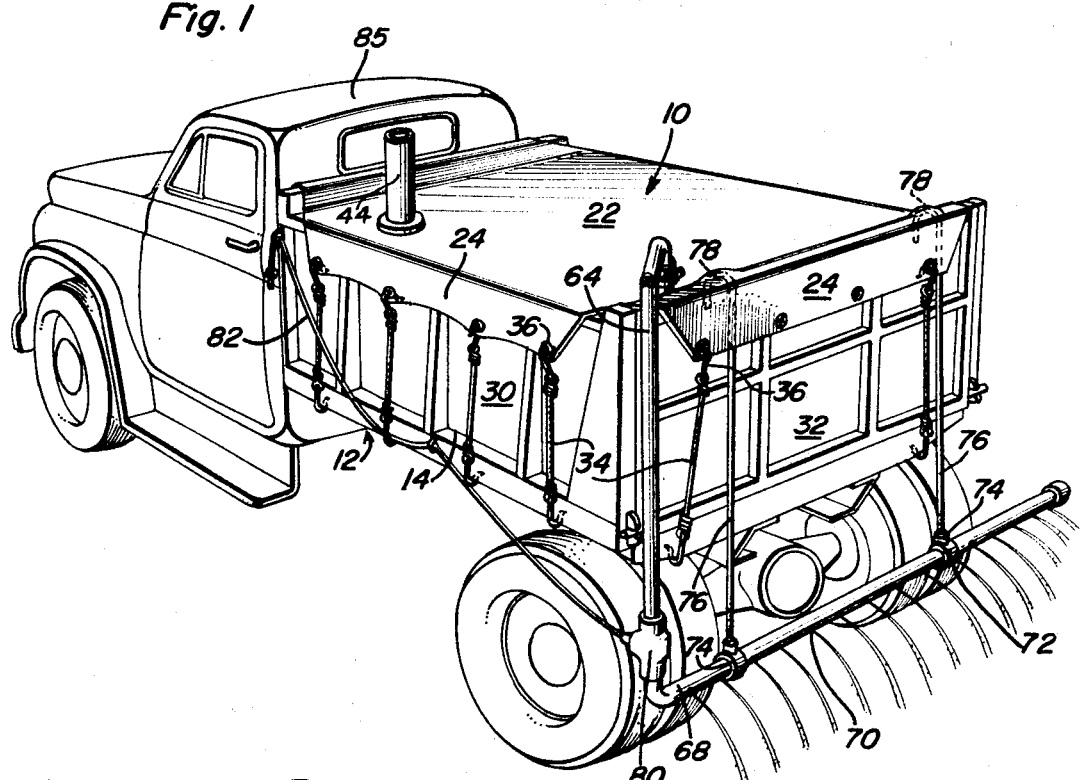
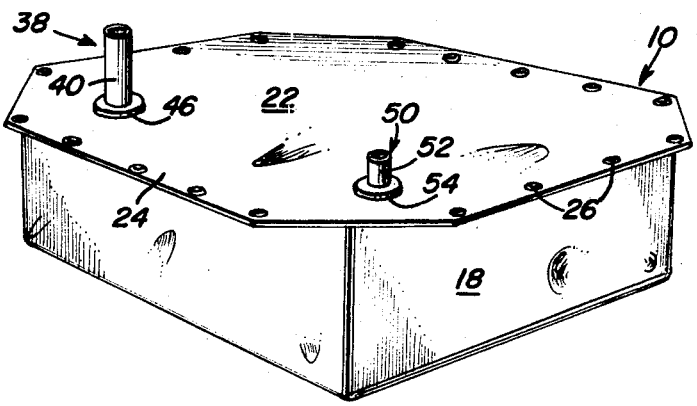
Philip Kantor
Hal H. Kantor
INVENTORS

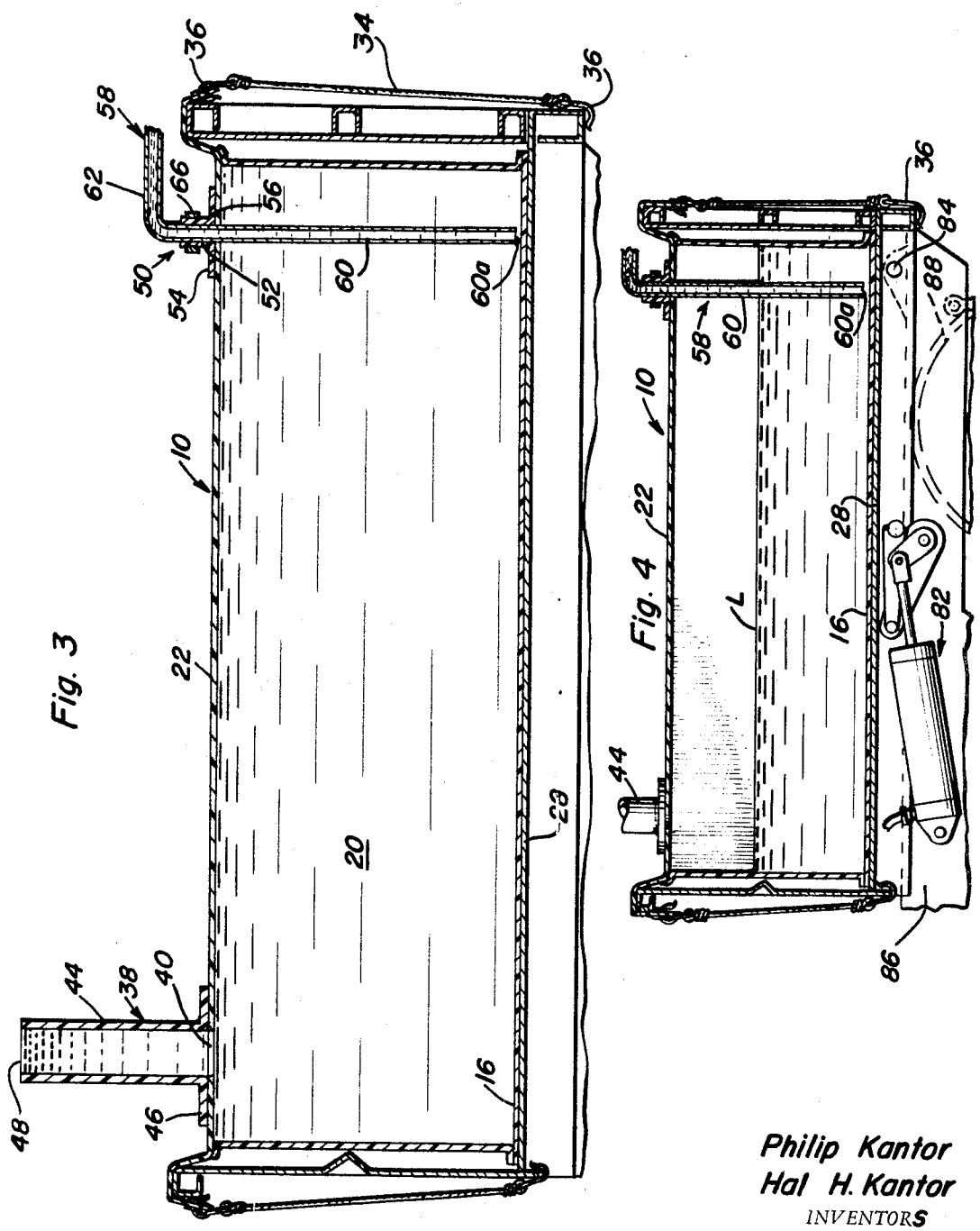

Philip Kantor
Hal H. Kantor
INVENTORS

United States Patent Office 3,393,835
Patented July 23, 1968

3,393,835
FLEXIBLE CONTAINER FOR A PUMPABLE SUBSTANCE AND METHOD FOR DISCHARGING SUCH SUBSTANCE THEREFROM
Philip Kantor and Hal H. Kantor, both of 5661 Shady Glen Road, Memphis, Tenn. 38117
Filed July 19, 1966, Ser. No. 566,433
1 Claim. (Cl. 222—105)

ABSTRACT OF THE DISCLOSURE

A flexible bag-like container is inserted into an open dump truck body. The container includes a filler stack extending upwardly from the container and a siphon-discharge pipe, one end being inserted within the container in close proximity to the bottom thereof. The discharge pipe continues in a generally U-shaped configuration, the bight portion of which extends outwardly from the bag container and continues downwardly alongside the container for final termination in a spray pipe. By adjusting the tilt of the dump truck body the bight portion of the discharge pipe becomes lower than the level of fluid in the container thereby permitting self-priming of the discharge pipe.

---

This invention generally appertains to means for storing, conveying and distributing pumpable substances and more particularly relates to novel and useful means for housing or carrying such pumpable substances in relation with the load compartment or body of a mobile vehicle.

The primary object of the present invention is to provide means for converting a vehicle, having a load compartment or supporting body, to serve as a fluid tight container for a pumpable substance with the load compartment or supporting body providing structural support to the pumpable substance.

In a preferred but not restricted environment, the present invention finds novel utilitarian usage for converting a conventional dump truck into a water tank principally, though not primarily, for use on construction projects. The load compartment or supporting bed of such vehicle is normally utilized for hauling gravel or similar granular-like material. Normally, a contractor has in his possession as equipment for the construction of a road any number of dump trucks, scrapers and levellers but, in view of the expense and ordinarily single applicability of a tank truck, the contractor has but one or possibly two water tank trucks at his immediate disposal. Considering the fact that the bed must be watered so as to be conditioned for the placement of the roadbed, whether asphalt or concrete, it can be appreciated that, under many conditions and circumstances, the contractor would desire to have at his disposal an unlimited number of water tank vehicles. However, as before stated, the economic factor obviates the immediate availability of water tank vehicles.

Therefore, while a conventional dump truck or similar type of haulage vehicle must ordinarily remain idle, it is a principal object of the present invention to convert such a vehicle into a water-tight container for the storing, conveying and distributing of water in connection with the conditioning of the roadbed.

However, it is to be understood that the foregoing environmental usage of the apparatus and method of the present invention is merely outlined so as to provide a basis upon which the novelty of the present invention can be predicated and it remains obvious that the present invention has many other environmental uses. Along this line, for example, the present invention contemplates the storing, conveying and discharging of any pumpable substance through the utilization of a flexible and collapsible bag-like container which is removably disposed in the load compartment or body of a vehicle, whether self-propelled or drafted by a traction vehicle, so that such pumpable substance can be conveyed to any given area and distributed or discharged. Comensurate with the foregoing, it is contemplated that the pumpable substance, which in the instance of road building would be water, can be a fluid chemical mixture for agricultural purposes and can also be any pumpable substance for whatever purpose desired.

Another important object of the present invention is to convert the load compartment or body of a vehicle into a closed container for the haulage of pumpable substances, such load compartment having an unobstructed open top and the conversion thereof being accomplished or brought about by virtue of a flexible bag-like liner removably disposed therein and having inlet and outlet means for introduction into and discharge or removal therefrom of the pumpable substance through the open top of the load compartment without any structural modification of the wall structure of the load compartment or body of such vehicle.

Another important object of the present invention is to utilize an ordinary freight carrying vehicle, such as a dump truck, for the storing, transporting and distributing or discharging of a pumpable substance (such terminology being utilized to include any substance having a viscous or fluid quality and being capable of being removed by a pumping action) with the vehicle load compartment or body providing only structural support for the pumpable substance, which is housed or contained within a flexible and collapsible bag-like container removably disposed within the load compartment or body of such vehicle.

Another important object of the present invention is to provide a bag-like liner of flexible material which is adapted to be removably positioned or disposed within the load compartment or body of a vehicle and to house or contain a pumpable substance, the container having inlet and outlet means for the introduction into and the discharge from of the pumpable substance and being so structurally related with the load compartment or body of a vehicle that no modification, structurewise or functionwise of the load compartment or body of such vehicle is required.

Another important object of the present invention is to convert a conventional and ordinary dump truck, which is composed of a load compartment or body, rearwardly of the cab structure such load compartment having an open top and composed of a rigid bottom wall and an upstanding vertical wall structure into a vehicle for the haulage of a pumpable substance, more specifically a fluid, such as water or a fluid chemical mixture, with the pumpable substance being introduced and removed from the load compartment of the dump truck through the open top thereof so that no structural modification of the load compartment or body of the dump truck is necessitated or required.

Another important object of the present invention is to provide a bag-like liner of flexible material for containing a fluid, such container being adapted to be disposed in a removable fashion within the load compartment or body of an ordinary freight carrying or transporting vehicle having an open top, and such container having a top wall provided with inlet means for introducing a pumpable substance thereinto and provided with an outlet means for discharging the substance therefrom, the discharge of the substance being effected by a pumping means in structural association with the container, said pumping means being responsive to and operable by a pressure differential exerted between the surface of the pumpable substance within the container and a point within the pumpable substance in the container remote from the surface thereof.

Another important object of the present invention is to provide a pumping means and method for discharging the pumpable substance from the flexible and collapsible bag-like container removably positioned or disposed in the open top load compartment or body of a vehicle, which pumping means discharges the pumpable substances through the open top of the load compartment or body of a vehicle responsive to and operable by a pressure differential exerted between the surface of the pumpable substance and a point within the pumpable substance remote from the surface. In line with the foregoing, the pumping means and method for discharging the pumpable substance, as aforedescribed, includes the utilization of any means responsive to and operable by a pressure differential exerted between the surface of the pumpable substance in the container and a point within the pumpable substance in the container remote from the surface thereof.

Another important object of the present invention is to convert a conventional and ordinary dump truck into a vehicle for the transportation and delivery of a fluid, principally for use on construction projects, such conversion being accomplished by the removable positioning of a bag-like container of flexible material within the open top load compartment or body of a dump truck and the discharging or dispensing of the fluid from the container through the open top of the load compartment or body of the dump truck under a pumping action which is primarily envisioned as a siphoning action effected by at least two methods.

The flexible container is provided with a top wall which has an inlet means and an outlet means and the inlet means is in the nature of a priming stack that is integrally associated with the top wall and upstands therefrom so as to permit the container to be filled with a fluid and the outlet means is provided with a siphon tube arrangement with the elbow portion of the siphon tube arrangement disposed below the upper open end of the priming or filler stack which is open to the atmosphere, so that the complete filling of the container with the fluid up to the point of the open end of the stack will exceed the elevation of the top of the siphon tube arrangement and therefore prime the same for ready distribution or discharge of the fluid under control of the valve means and structural association of the siphon tube arrangement.

Another important object of the present invention is to convert a conventional and ordinary dump truck into a carrier and discharger or distributing means for a fluid, with the discharging or dispensing of the fluid being effected by virtue of a siphon action put into operation by the elevation of the dump bed of the dump truck, utilizing the conventional hydraulic lift equipment of the dump truck.

Another important object of the present invention is to provide a mobile carrier and discharger for a pumpable substance comprising a mobile structure having a rigid open top load compartment composed of a rigid bottom wall and a rigid wall structure upstanding from the bottom wall and a bag-like container of flexible material removably disposed within the load compartment and adapted to contain a pumpable substance and conforming when expanded by virtue of containing the pumpable substance substantially to the interior space of said rigid load compartment to constitute a liner thereof and being buttressed by the wall structure of the load compartment and to provide pump means, which is removably detachably associated with the load compartment and associated with an outlet means that is connected with the container, for positively discharging the pumpable substance from the container.

Another important object of the present invention is to provide a flexible and collapsible bag-like container for a pumpable substance, such as water or any other fluid, which container is foldable into a small package when not in use and is adapted to be positioned within the load compartment of a mobile structure so as to store and discharge a fluid, the distribution or discharging of the fluid from the container being effected by a pumping means in structural association with the container and extending therefrom and being responsive to and operable by a pressure differential exerted between the surface of the pumpable substance or fluid in the container and a point within the pumpable substance or fluid in the container remote from the surface of the substance or fluid.

A further important object of the present invention is to provide a relatively inexpensive, compact and efficient means and method whereby a conventional freight carrying vehicle, such as a dump truck or trailer utilized for the bulk haulage of granulant pulverulent materials, can be used to store, convey and distribute or discharge a pumpable substance, such as a fluid or liquid, particularly but not restrictively water or a chemical mixture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a pumpable substance carrier and discharger constructed in accordance with the present invention and showing the same in operative relation with the load or body compartment of a dump truck, for exemplary purposes;

FIGURE 2 is a perspective view of the bag-like container of flexible material, constructed in accordance with the present invention and adapted to be removably disposed within the load compartment of a vehicle, as shown in FIGURE 1;

FIGURE 3 is a longitudinal, vertical sectional view of the container in position within the load compartment of a vehicle, such as a dump truck, and showing the same in a primed state for the discharge of the fluid housed or contained therein under a siphoning action;

FIGURE 4 is a longitudinal, vertical sectional view of the container in structural association with the load compartment or body of a dump truck, illustrating the utilization of the conventional dumping body for priming the siphoning means, which constitutes a pumping means for the discharge of the fluid from the container;

Figure 5:
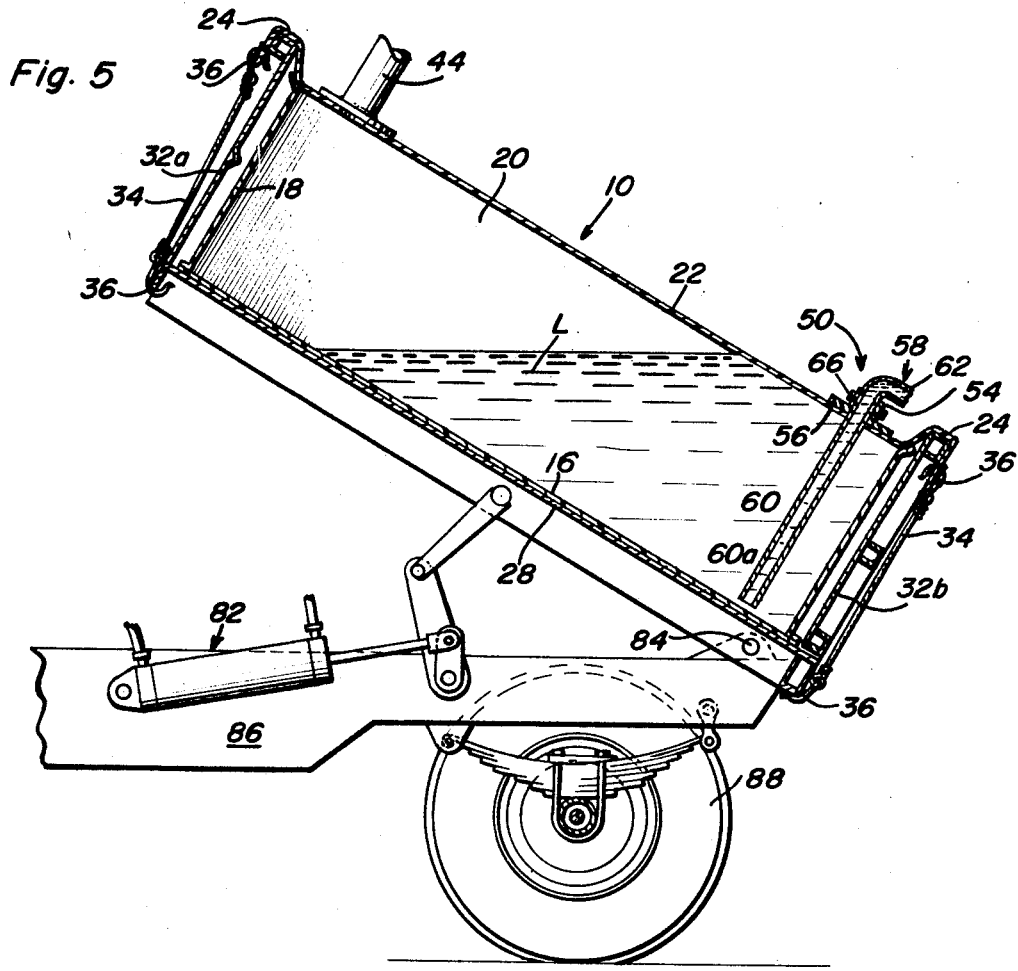
Figure 6:
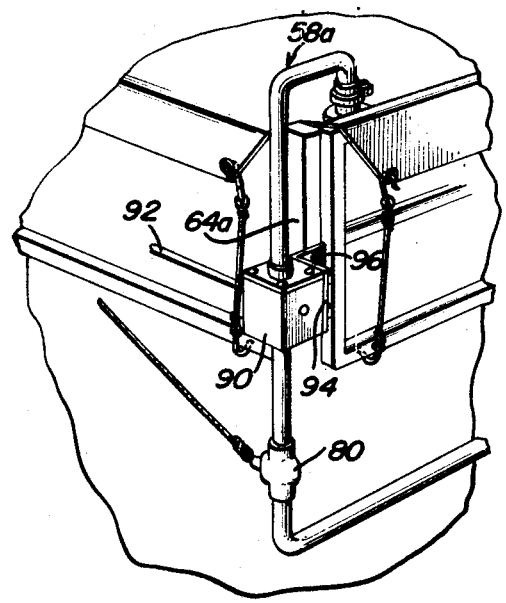

FIGURE 5 is a view similar to FIGURE 4 but showing the body in its normally horizontal position, after being inclined as shown in FIGURE 4, so as to prime the siphoning means for pumping the fluid from the flexible container disposed or housed within the load compartment or body of the dumping unit of the dump truck; and FIGURE 6 is a fragmentary perspective view of a mechanical pump means, which can be utilized for positively evacuating the pumpable substance or fluid from the bag-like container disposed within the load compartment or body of a vehicle.

Referring now more particularly to the drawings and initially to FIGURE 2, a bag-like container 10, which is composed of flexible material is constructed so as to constitute a liner for the interior space of a load compartment of a vehicle 12, as shown in FIGURE 1.

The container 10 is flexible and collapsible and is formed from virgin vinyl, poly vinyl chloride, neoprene, rubber, pre-shrunk canvas rayon or any other flexible material which is impervious to liquid and which is waterproof and mildew proof, and also can be resistant to acid and alkalies.

The container 10 may be formed in any geometrical shape, so as to complement the interior space of the load compartment 14 of the vehicle, which is shown for exemplary purposes as a conventional or ordinary dump truck.

The flexible or collapsible container 10, with respect to the illustrated environmental use, is composed of a bottom wall 16 and opposing end walls 18 and side walls 20 and a top wall 22. The walls are serured together in a fluid and airtight manner so as to constitute the flexible and collapsible container 10. In the instance of plastic or rubber materials, the walls may be heat sealed at their juncture points but any other securing means may be utilized, providing that the juncture of the walls provides a fluid and airtight seal between the walls so that the integral, actually one-piece bag-like container 10 of flexible material can be realized.

The top wall 22 is formed with flaps 24 which extend beyond the side and end walls and which, constant with the flexibility of the container 10, are flexible so as to be positionable in any desired relation to the load compartment 14 of the vehicle 12.

The extension flaps 24 of the top wall 22 are provided or formed with openings 26 within which reinforcing grommets are disposed.

As shown in FIGURE 1, the bag-like container of flexible material 10 is seated or deposited physically within the interior of the load compartment 14, such being composed of a rigid bottom wall 28 and upstanding side walls 30 and opposing, upstanding end walls 32, with the same having an open top. The flaps 24 constitute a means, with structural relationship therewith of the grommet reinforced openings 26, for anchoring or positively physically positioning the container 10 within the interior space of the load compartment, as can be realized from a consideration of FIGURE 1. Thus, the bag-like container or tank 10 is physically positioned or deposited within the open top load compartment or body 14 and the flaps 24 extend beyond the wall structure, constituted by the side and end walls 30 and 32, respectively, of the load compartment of the vehicle, and the flaps serve as an anchoring or placement means for the container 10. In this respect, as shown in FIGURE 1, flexible members 34 are provided at their opposite ends with hook-like anchor means 36, such anchor means being adapted to fit within the grommet reinforced openings 26 in the flaps 24 and to engage under the bottom structural members of the side and end walls of the load compartment, as shown in FIGURES 1 and 3. By virtue of the flexible elements 34, which are adjustable in length and may be constituted by steel cables, wires, ropes or the like, with the ends thereof having the hook-like means 36, the flaps 24 are physically secured to the rigid structure of the load compartment or body 14, without any structural modifications of the wall structure or bottom of the load compartment and in a manner, so that the container or tank 10 is positively located within the confines of the load compartment or body 14.

As indicated, the container or tank 10 is provided to convert the load compartment or body 14 of the vehicle 12 into a carrier for a pumpable substance, definable as a fluid, and as an important feature, inlet and outlet means are structurally associated with the container 10 so as to introduce into the container and discharge from the container fluid without necessitating or requiring any structural modification of the load compartment 14 or the vehicle 12.

The inlet and outlet means are preferably structurally associated with the top wall 22 of the container or tank 10 for reasons of economy and simplicity and compactness, relative to the storability of the container or tank 10. However, such inlet and outlet means may be provided in structural association with one of the side walls or end walls of the container or tank 10.

As shown more particularly in FIGURE 3, the inlet means, generally designated by the numeral 38 includes an opening 40 formed in the top wall 22 and a filler stack 44 which vertically upstands from the top wall 22. The filler stack 44 is formed of the same material as the container or tank 10 but, preferably, is of a more increased or greater thickness and has an external mounting flange 46 on its lower open end. The mounting flange 46 is secured, as by heat seal means or any other means, on the top wall 22 in superimposed fixed relation therewith so that the interior of the stack 44 is in direct communication with the opening 40. The stack 44 upstands from the top wall 22 of the container and terminates in an open upper end 48 which is constantly in communication with the atmosphere so that the filler stack 44 not only constitutes a means whereby the container or tank 10 can be filled with a pumpable substance but also constitutes a means for communicating the interior of the container or tank 10 with the atmosphere.

The top wall 22 is provided with an outlet means 50, as more apparent in FIGURE 3, for the discharge of the pumpable substance from the container or tank 10 under a pumping action, as will be described. The outlet means 50 is partially composed of a collar 52 which has an outer flanged lower end 54. The flanged end portion 54 is fixedly superimposed on the top wall 22 so as to dispose the collar 52 in direct communication with an opening 56 formed in the top wall 22.

Constituting parts of the discharge means for evacuating or discharging the fluid contained within the container or tank 10 is a conduit means 58. The conduit means 58 is comprised of a first vertical portion 60, which is introduced into the collar 52 and has a lower open end 60a that is disposed or positioned slightly above the bottom wall 16 of the container or tank 10. The conduit means 58, which constitutes in association with the tank or container 10, a discharge means for the pumpable substance or fluid housed or contained therein, is provided with a general or substantially horizontally disposed connecting or elbow portion 62 that communicates the first vertical portion 60 with a second vertical conduit pipe 64 that is disposed exteriorly of the wall structure constituting the load compartment 14, as shown in FIGURE 1.

It is important that the conduit means 50 be structurally related with the tank or container 22 in airtight and fluid tight relationship so that consequently the first vertical pipe or conduit section 60, which is immersed within the container or tank 22, is disposed concentrically within the upstanding collar 52 and is in a fixed airtight and fluid-tight relationship therewith by means of an encircling strap 66 which clamps the conduit section 60 within the collar 52.

As an exemplary but not restricted illustration of the advantage of the exterior vertically depending tube or conduit section 64, attention is directed to FIGURE 1 of the drawings. As shown in FIGURE 1, the lower end of the exterior pipe or conduit section 64 is provided with a terminal spray pipe 68 which, in the illustrated embodiment, is orientated transversely of the load compartment 14 of the vehicle 12 so as to enable the fluid within the container or tank 10 to be discharged as the vehicle moves in a lengthwise directional path. The spray pipe 68 is formed with apertures or openings 70 that permit the fluid to flow onto the ground and the spray pipe 70 is removably associated in a structural manner for its own support and for supporting the exterior pipe or conduit section 64 with the rear wall of the load compartment 14 of the vehicle 12.

Merely for exemplary purposes, the spray pipe 70 is provided intermediate its ends with encircling or circumposed hanger attachment members 72 that have an upper internally threaded socket portion 74 to receive hanger rods 76 which extend upwardly therefrom and which terminate at their upper ends in hooks 78 that are adapted to be removably fixed on the upper end edge of the rear wall 32, in the shown instance being a tailgate for the load compartment or body 14.

Valve means 80 is operatively interposed between the lower end portion of the exterior pipe or conduit portion 64 of the discharge conduit means and the spray rod or bar so as to control the flow of the fluid or pumpable substance from the interior of the container or tank 10 through the outflow or discharge apertures or openings 70 in the spray bar 68.

The valve means 80 is of a spring urged type so that normally it is closed to prevent the flow of the fluid substance from the exterior and vertically depending conduit or pipe section 64 into the spray bar and is operable in many ways so as to condition itself, with regard to creating an open and unobstructed passageway between the depending conduit section or pipe 64 and the spray bar for the flow of the pumpable substance or fluid. Being spring urged to a closed position, the valve means 80, may be opened, against the urging of its structurally associated closing spring means by a flexible element or cable 82 which is positioned exteriorly of the load compartment 14 and extends to the cab compartment 85 so that the operator or driver of the vehicle 12 can through manual manipulation of the cable element 82 personally open and close the valve means 80. This will control the outflow of the fluid or pumpable substance, equatable with the fluid, from the spray bar or rod 68. However, it is contemplated that the valve means 80 can be of any structural type and, while it is shown that the same is operated by the manual inducement of the pull of the flexible cable or cord 82, it is contemplated that the same could be electrically controlled so that it would be in the nature of an electrical solenoid valve arrangement which would be operated by the driver of the vehicle but energized through the electrical system of the vehicle. On the other hand, it is also contemplated that the valve means 80 can be under the operational influence of the hydraulic system of the vehicle with the operator of the vehicle controlling the same.

In any event, it is desired that the valve means 80 be under the control of the driver of the vehicle or, in the event that the vehicle is drafted by a traction vehicle, be under the control of the operator and driver of the traction vehicle so that the opening and closing of the valve means 80 will be in response to the intentions and desires of the operator, either of the vehicle 12 or a traction vehicle which is in coupled relation with the load compartment 14.

While the conduit means 58 is primarily intended to be a one-piece or integral tubing or pipe, which is formed from aluminum material or the like, it can be appreciated that the same can be formed in divisible sections so that the elbow portion 62 can be in the nature of a joint having gasket means structurally associated therewith so as to permit the revolvability of the exterior, depending section 64 relative to the load compartment or body 14 of the vehicle 12. Furthermore, it can be appreciated that the spray bar or spray rod assembly 68 is shown and described, in connection with the container 10, as an exemplary feature of the present invention because the spray bar can be eliminated and any discharge conduit means can be attached to the conduit or pipe section 64 for enabling the pumpable substance or fluid housed or contained with the container or tank 10 to be discharged onto any given area or into any type receptacle.

In connection with the filling and discharging of the pumpable substance, which as aforedescribed is intended to cover any viscous material or any substance having any fluid for liquid consistency, the discharging of the fluid sustance from the container or tank 10 is caused in response to and operable by a pressure differential exerted between the surface of the pumpable substance within the container or tank 10 and a point within the pumpable substance or fluid remote from the surface thereof. In other words, free gravitational flow, which requires a structural modification of the load compartment is not intended but what is intended is a discharging of the pumpable substance or fluid through the open top of the load compartment 14 responsive to and operable by a pressure differential exerted between the surface of the pumpable substance of the fluid and a point within the pumpable substance or fluid remote from the surface thereof.

With attention directed to FIGURE 3, it can be realized that the objective, as aforestated, can be achieved by filling the container or tank 10 to a complete state or condition. In this respect, the container or tank 10 is filled with the requisite or required pumpable substance or fluid, after the container has been unfolded or unrolled from its collapsed state and disposed within the confines of the structural support or load compartments 14 of the vehicle, either self-propelled or drafted. The bag-like container of flexible material 10 is filled with the pumpable substance or fluid through the filler stack 44 by the mere insertion of any delivery conduit means into the open upper end 48 of the filler stack 44. So as to condition the container 10 for a siphoning action in its course of discharging the material disposed and container therein, which siphoning action is a pumping means, the valve means 80 is opened until the entire discharge conduit means 58 is filled with the pumpable substance or liquid and the filler stack 44 is filled up to the open upper end 48 thereof. As can be realized from FIGURE 3, the open end 48 of the filler stack 44 is disposed vertically above the elbow section 62 of the outlet conduit means, and well above the immersed section 60 of the conduit means so that the pumpable substance or fluid can flow over the wall of the load compartment under atmospheric pressure through the open end 48 of the filler stack 44 to the actual discharge conduit section or pipe 64 and therefrom to the spray bar 68 or any other outlet means.

Therefore, by filling the bag-like container or tank 10 in the manner aforestated, so that the pumpable substance or fluid in the filler stack 44 is disposed at a vertical elevational point above the elbow portion 62 of the discharge conduit means 58, which has already been primed with the pumpable substance or fluid, it can be appreciated to discharge the pumpable substance or fluid it is only necessary to actuate the valve means 80, which can be done manually or which can be actuated in any suitable fashion depending upon the mechanical attributes of the vehicle 12, or, in the instance where the container is disposed in a drafted vehicle, depending upon the mechanical attributes of the traction vehicles.

There is a specific frictional relationship between the load compartment 14 of the dump truck 12 and the flexible and collapsible container 10 removably disposed therein, inasmuch as the load compartment of the dump truck can be utilized for the purpose of effecting the siphon action.

As aforedescribed, the siphon action very simply consists of filling the tank and the filler stack 44 until the fluid level in the filler stack 44 is higher than the elevation of the elbow section 62 of the conduit discharge means. Obviously, this will cause the siphon conduit means to become primed and then dispensing of the fluid or pumpable substance will be automatic, under the control of the valve means 80, which may be controlled in any given manner.

This constitutes a method of starting the siphon action by virtue of filling the container or tank 10 and the filling stack 44, which is higher than the elevation of the top of the siphon tube conduit means 58. Consequently, this would cause the siphon tube conduit means 58 to become primed and then dispensing of the pumpable substance or fluid would be automatic through the conduit means under the control of the valve means 80, which is controllable by the operator of the vehicle 12 or, in any event, under the control of an operator.

As has been described, one of the primary aims and purposes of the present invention is to convert an open top dump bed into a carrier and distributor for liquids by the use of a flexible tank and entegrally associated siphon system. Therefore attention is directed to FIGURES 4 and 5. Assuming that the quantity of the fluid or pumpable substance within the confines of the bag-like container or flexible and collapsible tank 10 removably disposed within the load compartment or body structure 14 of the vehicle 12 is at a level wherein the surface thereof is below the primer stack 44, whereby the siphoning discharge action cannot be realized or affected by virtue of the filler stack 44, the load compartment 14 is brought into action. The load compartment 14 is structurally and functionally unaltered so that it is utilized by the present invention for the disposition or placement of the bag-like flexible container or tank 10 within the load compartment or body structure 14. The dump truck is conventionally provided with a hydraulic hoist assembly, generally designated by the reference numeral 82, which assembly, through strong lifting arms and hydraulic pressure, is adapted to dispose the truck body 14 at inclined angular positions, relative to its normal position, with the truck body being movable about a generally horizontally disposed pivot point 84, which is in structural relationship with the body supporting framework 86 that is in ground engagement by virtue of ground engaging wheels 88.

Therefore, as can be appreciated from a consideration of FIGURE 4, the discharge conduit means 58 can be primed by tilting or inclining the supporting load compartment or truck body 14. In this regard, the filler stack 44 is disposed adjacent the front wall 32a of the truck body whereas the discharge conduit means 58 is disposed adjacent the rear wall 32b. Consequently, in reaction to the elevation of the truck body or load compartment 14 about its pivotal axis 84, the fluid L will cause the conduit means 58 to be primed and then the truck bed or body or load compartment 14 can be lowered to its normal position, as shown in FIGURE 5, wherein the liquid will have already primed the conduit means 58 and the siphoning action, as before described, can be carried out through the utilization of the valve means 80.

As thus far described, the pumping means is constituted by a siphoning action but it is intended that the container 10 can have associated with the outlet conduit means a pump for the forcible evacuation or discharge of the pumpable substance or fluid therein.

Thus, as shown in FIGURE 6, the conduit means 58a is provided in its exterior leg portion 64a with a pump 90. The pump can be disposed at any point in the conduit means 58a from the inlet end of the immersible leg portion to the valve means 80. The pump 90 is of a self-priming, centrifugal side delivery type or form and is powered by a shaft means or drive means 92, which rotates the rotor assembly of the pump 90. The shaft means 92 is adapted to be driven in structural and detachable association with the power take-off of the vehicle. The housing for the pump 94 is provided with a bracket means 96 so that the same may be easily and conveniently attached, in a removable fashion, to the wall structure of the vehicle.

It is also contemplated that the pump 90 may be mounted by a bracket means, which is fastened to the wall structure of the vehicle in a removable fashion, and is of a self-contained power driven unit. In this respect, the pump would have as a structural and driving adjunct a gasoline engine or similar prime mover and the conduit means would be structurally associated with the pump so that the entire arrangement would be in detachable structural orientation with the exterior of the truck body or load compartment 14 and in detachable structural association with the flexible and collapsible tank 10 for the forcible discharge of the pumpable substance or fluid within the confines of the tank 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A vehicle having a compartment in combination with a flexible container comprising, a bag-like container of flexible material removably disposed in said compartment and adapted to contain a fluid conforming when expanded substantially to the interior space of said compartment as though a liner thereof, said container having a top wall and inlet means including a filler stack carried by the top wall, said container further having a bottom thereof, outlet means including the provision of an outlet opening in the top wall, conduit means attached to said outlet means, said conduit means being of generally U-shaped construction having a first end portion extending through the outlet opening and disposed within the container to a point spaced near the bottom wall, said conduit means further including a valve means structurally associated therewith for controlling the discharge of fluid from the spray pipe, a second end portion of said conduit means attached to said valve, and further wherein said load compartment is tiltable in a vertically inclined angular position out of its normal horizontal position so as to fill the conduit means entirely with the fluid and dispose the conduit means below the topmost level of fluid contained in said container thereby causing self-priming of said conduit means for initiating siphon action to discharge fluid from the container under the influence of atmospheric pressure exerted on the surface of the fluid through the filler stack, said conduit means further including a terminal spray pipe disposed substantially in a horizontal plane exteriorly of the load compartment and having discharge means for the outflow of the fluid, and detachable means structurally connected between the container and the walls of the load compartment exteriorly of said walls for positively positioning the container within the load compartment.

References Cited

UNITED STATES PATENTS

| | | | |
|---|---|---|---|
| 667,947 | 2/1901 | Morrison | 222—416 XR |
| 974,336 | 11/1910 | Alt | 222—416 XR |
| 1,772,903 | 8/1930 | Lawson | 222—416 |
| 2,031,262 | 2/1936 | Hill | 222—178 XR |
| 2,160,741 | 5/1939 | Jensen et al. | 222—178 XR |
| 2,618,409 | 11/1952 | Eisenberger et al. | 222—105 XR |
| 3,095,206 | 6/1963 | Fresia et al. | 222—176 XR |
| 3,096,912 | 7/1963 | Rivette | 222—183 |
| 3,125,345 | 3/1964 | Ellis | 222—178 XR |
| 3,138,293 | 6/1964 | Roak et al. | 222—105 |

WALTER SOBIN, *Primary Examiner.*